3,284,361
Patented Nov. 8, 1966

3,284,361
AIR FILTER COATING COMPOSITION
Albert G. Rocchini, Oakmont, and Charles E. Trautman, Cheswick, Pa., assignors to Gulf Research & Development Company, Pittsburgh, Pa., a corporation of Delaware
No Drawing. Filed July 27, 1964, Ser. No. 385,469
6 Claims. (Cl. 252—88)

This invention relates to a coating composition for filters, and more particularly to a composition for applying to filtering media for use in filtering air and other gases.

In forced air heating systems, air conditioning units and the like, the air is usually passed through a filtering system to remove dust particles and other foreign solid bodies present in the air. The filtering media used in air filtering systems may vary but in any case is a material which forms a circuitous path through which the air must pass.

Materials commonly employed as the filtering media in air filters include cellulosic fiber aggregates, spun glass, glass wool, asbestos fiber, metal screening, metal chips and turnings, metal wool and the like. In order to improve the effectiveness of the filtering media, the media is usually coated with a substance to which dust particles and other suspended matter in the air will readily adhere. Some of the requirements of an air filter coating composition are as follows: (1) the coating composition shall have good dust adhesive qualities; (2) the coating shall not gum or solidify on the filtering media in service; (3) the coating shall have good wetting properties to insure wetting of the filtering media as well as wetting of the dust particles; (4) the coating shall neither burn nor sustain a flame; and (5) the coating shall not produce heavy smoke on momentary ignition.

Among the substances which previously have been used to coat filtering media are heavy mineral oil fractions, soap-thickened oils, polyethylene-thickened oils, liquid organic phosphates and petroleum wax. The prior compositions, however, have not been entirely satisfactory. For example, when a heavy mineral oil is used, the oil is not sufficiently tacky to hold the dust particles on the filter. If a lighter mineral oil is used, the oil has a tendency to flow from the filtering media, leaving only the uncoated filtering media which, of itself, is not an efficient dust gathering material. The lighter mineral oils are further undesirable for use in heating systems because of the fire hazard created by volatilization of the oil. While the thickened oils adhere more tenaciously to the filtering media than the unthickened oils, the thickened oils are less easily applied and their ability to wet the dust particles is less than the corresponding unthickened oils.

As noted above, an efficient filter is one wherein the coating composition not only wets the filtering media but also wets the dust particles so that there is a tendency to form superimposed layers of dust on the filtering media as further filtering takes place. While the liquid organic phosphates such as tricresyl phosphate have good wetting characteristics and do not create a fire hazard when used in heating systems, their viscosity is such that they tend to flow from the filtering media thus reducing the efficiency of the filter. Petroleum wax adheres to the filtering media but petroleum wax does not have the desired wetting characteristics to collect and hold large quantities of dust particles.

We have found that a composition having the desirable properties set forth hereinabove and adapted for coating the surfaces of filtering media for use in filtering air and other gases can be obtained by blending together tricresyl phosphate, a mineral oil and a liquid chlorinated hydrocarbon. Thus, the air filter coating composition of our invention consists essentially of a homogeneous mixture of tricresyl phosphate, a mineral oil and a liquid chlorinated hydrocarbon. The coating composition of the invention can be easily applied to filtering media either by dipping the filtering media in the composition or by spraying the composition on the filtering media.

Tricresyl phosphate is available commercially and, therefore, neither the compound per se nor its method of preparation constitutes any portion of the present invention. The tricresyl phosphate in the composition of our invention comprises about 55 to about 60 percent by volume of the total composition.

The mineral oil which is used in the composition of the invention can be either a refined or semi-refined paraffinic, naphthenic or asphalt base oil. If desired, a blend of oils of suitable viscosity can be employed instead of a single oil, by means of which any desired viscosity may be secured. The oil or blend of oils is preferably one having a viscosity of about 40 to about 45 Saybolt Universal seconds at 210° F., a flash point (ASTM D92) above about 335° F., a fire point (ASTM D92) above about 370° F. and a pour point (ASTM D97) below about −30° F. If the viscosity of the mineral oil is outside the range of about 40 to about 45 SUS at 210° F., the coating composition does not have the desired flow property. Desired non-flammability properties in the coating composition require the use of a mineral oil having a flash point above about 335° F. and a fire point above about 370° F. The mineral oil preferably has a pour point below about −30° F. in order to obtain a coating composition which is easy to apply and does not solidify at low temperatures. The mineral oil content of the composition of the invention comprises about 10 to about 20 percent by volume of the total composition.

Tricresyl phosphate and mineral oil, especially highly refined, highly naphthenic oils are not readily compatible with each other, mixtures thereof frequently exhibiting undesirable haze or cloudiness. This effect is not always apparent at the time of blending the tricresyl phosphate with the oil, but may appear when the mixture is stored for a short period of time. The maximum amount of mineral oil which is soluble in tricresyl phosphate is usually less than 5 percent by volume. By employing a liquid chlorinated hydrocarbon in conjunction with the tricresyl phosphate and mineral oil, we are able to form a stable solution with about equal volumes of mineral oil and tricresyl phosphate.

The liquid chlorinated hydrocarbon which is used in the composition of the invention is preferably one having a viscosity of about 160 to about 170 Saybolt Universal seconds at 210° F., a pour point (ASTM D97) below about +10° F. and a chlorine content of about 40 to about 55 percent by weight. If the viscosity of the liquid chlorinated hydrocarbon is outside the range of about 160 to about 170 SUS at 210° F., the coating composition does not have the desired flow and adhesive properties. The chlorinated hydrocarbon preferably has a pour point below about +10° F. in order to obtain a coating composition which will not solidify at low temperatures. The chlorine content is preferably within the range of about 40 to about 55 percent by weight in order to produce a homogeneous and flame proof mixture. The liquid chlorinated hydrocarbon which we employ is soluble in mineral oil and acts as a solubilizer in increasing the compatibility of mineral oil and tricresyl phosphate. The liquid chlorinated hydrocarbon comprises about 20 to about 30 percent by volume of the total air-filter coating composition.

Among the chlorinated hydrocarbons which can be used in the composition of our invention are chlorinated paraffin wax, chloronaphthalenes, chlorinated diphenyl, terphenyl, polyphenyl and mixtures thereof. It will be recognized that chlorinated hydrocarbons may exist normally as a liquid or a solid. Whether or not a liquid or solid is obtained may depend upon the starting material, the particular chlorination process, the extent of the chlorination, the purity of the product, etc. In any event, we employ a chlorinated hydrocarbon which is normally a liquid at room or ambient temperatures.

The chlorinated hydrocarbons can be prepared by known processes for chlorinating hydrocarbons. Neither the chlorinated compounds nor their method of preparation constitutes any portion of the present invention. In the case of chlorinated paraffin wax, the starting material can be a paraffinic hydrocarbon having at least about 18 carbon atoms in the molecule. A preferred petroleum wax starting material is one having a melting point of at least about 120° F., a molecular weight of about 250 and about 20 carbons in the molecule. To obtain a liquid chlorinated paraffin wax, the petroleum wax is heated preferably at about 200° to about 225° F. while chlorine gas is passed through the molten mass. The specific gravity of the liquid chlorinated paraffin increases with increasing chlorine content. The molten wax is contacted with chlorine until the chlorine content thereof comprises about 40 to about 55 percent by weight of the wax composition.

In the case of chlorinated naphthalene, the starting material is naphthalene. Chlorination of the naphthalene is effected by passing chlorine through molten naphthalene in the presence of a catalyst such as ferric chloride or antimony chloride. Mixtures of chloronaphthalenes range from low-viscosity oils to very hard microcrystalline waxes. We employ the liquid chlorinated naphthalenes containing about 40 to about 55 percent by weight of chlorine.

In the case of chlorinated diphenyl, terphenyl and complex polyphenyls, anhydrous chlorine is used as the chlorinating agent. The pure compounds formed by the chlorination of diphenyl, terphenyl, or the more complex polyphenyls are crystalline solids. Mixtures of such chlorinated phenyl compounds are either liquids or non-crystalline resins. We utilize the liquid chlorinated phenyl materials containing about 40 to about 55 percent by weight of chlorine.

The coating composition of this invention can contain other components, if desired, to impart other properties to the composition without departing from the scope of the invention. Thus, the coating composition can contain a dye to impart a distinctive color to the composition and/or a scenting agent to give it a characteristic pleasant odor. In some instances, it may also be desirable to incorporate a bactericide such as propylene glycol in the coating composition. If other components are utilized, they should be selected so as not to adversely affect the flammability of the coating composition.

In compounding the coating composition of the invention, the components can be admixed with each other in any order either at room temperature or at an elevated temperature. According to one embodiment, the tricresyl phosphate is placed in a suitable vessel equipped with an agitating device. A solution of the chlorinated hydrocarbon in the mineral oil in the desired proportions is then added to the vessel containing the tricresyl phosphate. The contents of the vessel are then agitated preferably at a temperature of about 150° F. until a homogeneous solution is obtained. If an additional component is employed, it can be incorporated in the oil before the oil is admixed with the chlorinated hydrocarbon or it can be introduced into the mixing vessel together with the other components.

The effectiveness of compositions of this invention in comparison with tricresyl phosphate as non-inflammable air filter coatings is demonstrated by a Pipe Cleaner Burning Test and a Torch Test. In the Pipe Cleaner Burning Test, a vacuum motor of an automobile windshield wiper equipped with a suitable pipe cleaner holder mounted on the wiper arm is mounted by means of a clamp and ring stand so that the wiper arm oscillates in a horizontal plane into the flame from a laboratory burner. The vacuum actuating the motor is adjusted so that the wiper arm and holder makes 25±2 cycles per minute. The pipe cleaners are cut into 2-inch lengths and soaked in the test fluid for one minute and allowed to drain for one minute. The treated specimen is mounted in the apparatus so that its outer end will form an arc of 4±⅛ inches. The laboratory burner is adjusted with sufficient air to provide a non-luminous flame approximately 4 inches high but not enough to form a sharp inner cone. The pipe cleaner is cycled so that the center of the 2-inch length is in the center of the flame located at one extreme of the cycle. The number of cycles necessary before a self-sustaining flame is achieved is recorded. In the Torch Test, fiber glass batting is cut into 6-inch squares. The test fluid is sprayed on the test specimen with a hand sprayer until droplets form on the fiber. Comparison squares are also prepared with the fiber impregnated with tricresyl phosphate. A square treated with the test fluid is placed next to a square treated with tricresyl phosphate and both are momentarily touched with the flame of a propane torch. A comparison is made between the square treated with the test fluid and the square treated with tricresyl phosphate with respect to their relative burning and smoking tendencies.

The results of the comparative tests on a series of compositions are set forth in Table I. In the illustrative compositions shown in Table I, the mineral oil is a highly refined naphthenic oil having a viscosity of 43.5 SUS at 210° F., a flash point of 340° F., a fire point of 375° F. and a pour point of −40° F. "Chlorowax 40" is a product of Diamond Alkali Company and is believed to be chlorinated paraffin wax. "Anglamol 40" is a product of The Lubrizol Corporation and is believed to be chlorinated paraffin wax. "Chlorowax 40" and "Anglamol 40" have as typical characteristics a viscosity of about 160 to

*Table I*

| Composition, Percent By Volume | A | B | C | D | E | F | G | H | I |
|---|---|---|---|---|---|---|---|---|---|
| Tricresyl phosphate | 100 |  | 85 |  | 60 | 60 | 60 | 60 | 50 |
| Mineral oil |  | 100 | 15 | 20 | 20 | 10 | 20 | 10 | 30 |
| Chlorinated Hydrocarbon: |  |  |  |  |  |  |  |  |  |
| "Chlorowax 40" |  |  |  | 80 | 20 | 30 |  |  | 20 |
| "Anglamol 40" |  |  |  |  |  |  | 20 | 30 |  |
| Inspection solubility | (1) | (1) | (2) | (1) | (1) | (1) | (1) | (1) | (1) |
| Flammability Tests: |  |  |  |  |  |  |  |  |  |
| Pipe Cleaner Tests, cycles to self-sustaining flame. | 60+ | 10 | 24 | 60+ | 60+ | 60+ | 60+ | 60+ | 25 |
| Torch Test, as compared with tricresyl phosphate (TCP): |  |  |  |  |  |  |  |  |  |
| Burning [3] |  | N | N | N | S | B | S | B | N |
| Smoke [3] |  | N | N | N | B | B | B | B | N |

[1] Clear.
[2] Cloudy.
[3] N signifies a result which is not as good as the result obtained with TCP. S signifies a result which is the same as the result obtained with TCP. B signifies a result which is better than the result obtained with TCP.

about 170 SUS at 210° F., a pour point of about +5° F. and a chlorine content of about 40 to about 45 percent by weight.

The improved characteristics obtained with compositions of the invention (Compositions E, F, G and H) are self-evident from the data in Table I. It will be noted that when only the mineral oil was used (Composition B), a self-sustaining flame occurred after 10 cycles in the Pipe Cleaner Test. In the Torch Test, Composition B was inferior to tricresyl phosphate both with respect to its burning and smoking tendencies. Composition C consisting of tricresyl phosphate and mineral oil was cloudy and was inferior to Composition A in both the Pipe Cleaner Test and the Torch Test. Composition D consisting of mineral oil and chlorinated hydrocarbon was clear and gave good performance in the Pipe Cleaner Test but was inferior to Composition A in the Torch Test. Compositions E, F, G and H consisting of tricresyl phosphate, mineral oil and chlorinated hydrocarbon in proportions within the scope of the invention gave good performance in the Pipe Cleaner Test and performed better than Composition A with respect to their burning and/or smoking tendencies in accordance with the Torch Test. Composition I consisting of tricresyl phosphate, mineral oil and chlorinated hydrocarbon wherein the tricresyl phosphate was present in an amount less than the minimum critical amount and the mineral oil was present in an amount greater than the maximum critical amount gave a product which was clear but otherwise inferior to Composition A in both the Pipe Cleaner Test and the Torch Test.

Typical physical properties of coating compositions referred to in Table I as Compositions E and F are as follows:

|  | Composition | |
| --- | --- | --- |
|  | E | F |
| Specific Gravity, 60°/60° F. (ASTM D1298) | 1.125 | 1.145 |
| Viscosity, SUS: |  |  |
| At 100° F | 250.6 | 338.4 |
| At 210° F | 44.9 | 48.1 |
| Viscosity, Kin., Cs.: |  |  |
| At 100° F | 54 | 72.5 |
| At 210° F | 5.7 | 6.7 |
| Flash Point (ASTM D92), ° F | 445 | 460 |
| Fire Point (ASTM D92), ° F | 555 | 650 |
| Pour Point (ASTM D97), ° F | −15 | −5 |
| Color (ASTM D1500) | <3.0 | <3.5 |
| Ash (ASTM D482), Percent | 0.018 | 0.236 |

Other air filter coating compositions within the scope of the invention are illustrated in Table II.

*Table II*

| Composition, Percent By Volume | J | K | L |
| --- | --- | --- | --- |
| Tricresyl phosphate | 55 | 60 | 60 |
| Mineral oil (43.5 SUS at 210° F.; Flash point, 350° F.; Fire point, 380° F.; Pour point, −35° F.) | 20 | 15 | 10 |
| Chlorinated Hydrocarbon: |  |  |  |
| Chlorinated paraffin wax (40% chlorine) | 25 |  |  |
| Chlorinated naphthalene (45% chlorine) |  | 25 |  |
| Chlorinated diphenyl (55% chlorine) |  |  | 30 |

In field tests on air filters, Compositions E, F, and J gave excellent results. The composition of the invention has no disagreeable odor and is easy to apply to air filters at ambient temperatures. The composition has good dust adhesive qualities, does not gum or solidify on the filtering media, has good wetting properties with respect to both the filtering media and the dust particles, does not burn nor sustain a flame and does not produce heavy smoke when subjected to the flame of a torch.

While our invention has been described with reference to various specific examples and embodiments, it will be understood that the invention is not limited to such examples and embodiments and may be variously practiced within the scope of the claims hereinafter made.

We claim:
1. An air filter coating composition consisting essentially of a homogeneous mixture of about 55 to about 60 percent by volume of tricresyl phosphate, about 10 to about 20 percent by volume of a mineral oil having a viscosity of about 40 to about 45 SUS at 210° F. and about 20 to about 30 percent by volume of a liquid chlorinated hydrocarbon having a viscosity of about 160 to about 170 SUS at 210° F. and a chlorine content of about 40 to about 55 percent by weight.

2. An air filter coating composition consisting essentially of a homogeneous mixture of about 55 to about 60 percent by volume of tricresyl phosphate, about 10 to about 20 percent by volume of a mineral oil having a viscosity of about 40 to about 45 SUS at 210° F. and about 20 to about 30 percent by volume of a liquid chlorinated paraffin wax having a viscosity of about 160 to about 170 SUS at 210° F. and a chlorine content of about 40 to about 55 percent by weight.

3. An air filter coating composition consisting essentially of a homogeneous mixture of about 55 to about 60 percent by volume of tricresyl phosphate, about 10 to about 20 percent by volume of a mineral oil having a viscosity of about 40 to about 45 SUS at 210° F. and about 20 to about 30 percent by volume of a liquid chlorinated naphthalene having a viscosity of about 160 to about 170 SUS at 210° F. and a chlorine content of about 40 to about 55 percent by weight.

4. An air filter coating composition consisting essentially of a homogeneous mixture of about 55 to about 60 percent by volume of tricresyl phosphate, about 10 to about 20 percent by volume of a mineral oil having a viscosity of about 40 to about 45 SUS at 210° F. and about 20 to about 30 percent by volume of a liquid chlorinated diphenyl having a viscosity of about 160 to about 170 SUS at 210° F. and a chlorine content of about 40 to about 55 percent by weight.

5. An air filter coating composition consisting essentially of a homogeneous mixture of about 55 to about 60 percent by volume of tricresyl phosphate, about 10 to about 20 percent by volume of a mineral oil having a viscosity of about 43.5 SUS at 210° F. and about 20 to about 30 percent by volume of a liquid chlorinated paraffin wax having a viscosity of about 160 to about 170 SUS at 210° F. and a chlorine content of about 40 to about 45 percent by weight.

6. An air filter coating composition consisting essentially of about 60 percent by volume of tricresyl phosphate, about 10 percent by volume of a mineral oil having a viscosity of about 43.5 SUS at 210° F. and about 30 percent by volume of a liquid chlorinated paraffin wax having a viscosity of about 160 to about 170 SUS at 210° F. and a chlorine content of about 40 to about 45 percent by weight.

References Cited by the Examiner

UNITED STATES PATENTS 2,122,514   7/1938   Crocker et al. _____ 252—88
2,780,308   2/1957   Mullin et al. _____ 252—88

OTHER REFERENCES

Diamond Chlorowax Handbook, Diamond Alkali Co., Cleveland (1951), page 7.

SAMUEL H. BLECH, *Primary Examiner.*

ALBERT T. MEYERS, *Examiner.*

S. E. DARDEN, *Assistant Examiner.*